United States Patent
Shioiri et al.

(10) Patent No.: US 8,165,477 B2
(45) Date of Patent: Apr. 24, 2012

(54) LIGHT RECEIVING APPARATUS USING DQPSK DEMODULATION METHOD, AND DQPSK DEMODULATION METHOD

(75) Inventors: Satomi Shioiri, Minato-ku (JP); Kiyoshi Fukuchi, Minato-ku (JP); Toshiharu Ito, Minato-ku (JP); Hitoshi Takeshita, Minato-ku (JP)

(73) Assignee: NEC Corporation, Tokyo (JP)

( * ) Notice: Subject to any disclaimer, the term of this patent is extended or adjusted under 35 U.S.C. 154(b) by 720 days.

(21) Appl. No.: 11/951,856

(22) Filed: Dec. 6, 2007

(65) Prior Publication Data

US 2008/0152359 A1    Jun. 26, 2008

(30) Foreign Application Priority Data

Dec. 22, 2006  (JP) ................ 2006-345649

(51) Int. Cl.
*H04B 10/06* (2006.01)
*H04B 10/00* (2006.01)
*H04B 10/12* (2006.01)
*H04J 14/00* (2006.01)

(52) U.S. Cl. ........ 398/202; 398/188; 398/174; 398/140; 398/209; 398/155; 356/73.1; 375/330; 375/283

(58) Field of Classification Search .............. 398/188, 398/202, 174
See application file for complete search history.

(56) References Cited

U.S. PATENT DOCUMENTS

| | | | |
|---|---|---|---|
| 6,618,536 B1 * | 9/2003 | Heideman et al. | 385/132 |
| 7,529,490 B2 * | 5/2009 | Hoshida | 398/207 |
| 7,734,196 B2 * | 6/2010 | Takahara | 398/208 |
| 7,805,085 B2 * | 9/2010 | Noheji | 398/209 |
| 2003/0030874 A1 * | 2/2003 | Glingener et al. | 359/181 |
| 2004/0246466 A1 * | 12/2004 | Hunsche | 356/73.1 |
| 2007/0047971 A1 * | 3/2007 | Ikeuchi | 398/202 |
| 2007/0230625 A1 * | 10/2007 | Hironishi et al. | 375/329 |
| 2007/0297804 A1 * | 12/2007 | Honda et al. | 398/147 |
| 2009/0092392 A1 * | 4/2009 | Huang et al. | 398/79 |
| 2010/0111540 A1 * | 5/2010 | Caplan et al. | 398/140 |

FOREIGN PATENT DOCUMENTS

| | | | |
|---|---|---|---|
| EP | 1727301 A1 * | 11/2006 | |
| JP | 2004-516743 A | 6/2004 | |
| JP | 2006-211538 A | 8/2006 | |
| JP | 2006-217605 A | 8/2006 | |

OTHER PUBLICATIONS

R. A. Griffin, et al., Optical Differential Quadrature Phase-Shift Key (oDQPSK) for High Capacity Optical Transmission, Optical Fiber Communication Conference and Exhibit, the United States, Mar. 2002, WX6, pp. 367-368.

* cited by examiner

*Primary Examiner* — Shi K Li
*Assistant Examiner* — Oommen Jacob
(74) *Attorney, Agent, or Firm* — Sughrue Mion, PLLC

(57) ABSTRACT

The present invention provides a light receiving apparatus using the DQPSK demodulation method. The light receiving apparatus comprises: one Mach-Zehnder interferometer for branching a received light signal into light signals at two arms to allow the branched two light signals to interfere with each other; one balanced photoelectric converter for converting the two interfered light signals, by using the Mach-Zehnder interferometer, into an electric signal corresponding to a difference between light intensities of the two light signals; and a phase adjuster for dynamically shifting the phase of a light signal passed through one of the two arms at the Mach-Zehnder interferometer.

9 Claims, 2 Drawing Sheets

$a_n, b_n$=High or Low (n= natural number)

(in the case of 40Gbps(20GSps))

an,bn=High or Low (n=natural number)

LIGHT RECEIVING APPARATUS USING DQPSK DEMODULATION METHOD, AND DQPSK DEMODULATION METHOD

This application is based upon and claims the benefit of priority from Japanese patent application No. 2006-345649, filed on Dec. 22, 2006, the disclosure of which is incorporated herein in its entirety by reference.

BACKGROUND OF THE INVENTION

1. Field of the Invention

The present invention relates to a light receiving apparatus using a DQPSK (Differential Quadrature Phase-Shift Keying) demodulation method, and a DQPSK demodulation method, and more particularly to a light receiving apparatus using a DQPSK demodulation method and a DQPSK demodulation method, which are adapted for compactly realizing, at a low cost, an apparatus or a system using a DQPSK modulation scheme.

2. Description of the Related Art

The DQPSK modulation/demodulation method which is one of the modulation/demodulation methods in optical communication is a method excellent in utilization efficiency of wavelength, wavelength dispersion tolerance and polarization dispersion tolerance. For this reason, as described in Non-Patent Document 1, it is expected that the DQPSK modulation/demodulation method will be applied to high speed WDM (Wavelength Division Multiplexing) optical communication systems for which these merits are required. The configurations of transmitting/receiving apparatuses of such optical communication systems are shown in FIGS. 1 and 3 of Patent Document 1 and in FIG. 1 of Non-Patent Document 1.

[Patent Document 1] JP-A-2004-516743 (FIG. 1 and FIG. 3)

[Non-Patent Document 1] R. A. Griffin, et al., Optical Differential Quadrature Phase-Shift Key (oDQPSK) for High Capacity Optical Transmission, Optical Fiber Communication Conference and Exhibit, the United States, March 2002, WX6, pp. 367-368

Here, the configuration and the operation of a typical light receiving apparatus using the DQPSK demodulation method will be described with reference to FIGS. 1 to 4.

FIG. 1 is a block diagram showing a configuration example of a typical light receiving apparatus (demodulating apparatus) 220 using a DQPSK demodulation method.

Light receiving apparatus 220 shown in FIG. 1 comprises beam splitter 228, delay interferometers 230, 232, and balanced photoelectric converters 234, 236.

One of two light signals branched by beam splitter 228 is inputted to delay interferometer 230. Moreover, a light transmission path is formed within one arm 230a of delay interferometer 230 in order to create relative delay time τ with respect to the other arm 230b.

The other of the two light signals branched by beam splitter 228 is inputted to delay interferometer 232. Moreover, a light transmission path is formed within one arm 232a of delay interferometer 232 in order to create relative delay time τ with respect to the other arm 232b.

Delay time τ is realized by allowing optical path lengths of the two arms to be different from each other, i.e., by allowing the lengths of arms 230a, 232a to be respectively physically longer than lengths of arms 230b, 232b.

Further, electrodes are provided at shorter arms 230b, 232b of the delay interferometers 230, 232. Delay interferometers 230, 232 are configured so as to apply a voltage of a reasonable value to each electrode so that phase-shifts of π/4 and −π/4 are fixedly given to a light signal.

FIG. 2 is an explanatory view showing an example of light signal E(t) 214 of typical DQPSK shown in FIG. 1. FIG. 3 is a diagram for explaining the phase state of light signal E(t) 214 of typical DQPSK shown in FIG. 2.

As shown in FIGS. 2 and 3, phase θ of light signal E(t) 214 results in one from among {π/4, 3π3/4, 5π/4, 7π/4} every symbol. An original signal of light signal E(t) 214 is encoded, and is mapped with respect to phase difference Δθ between the original signal and a signal preceding by one symbol. Δθ indicates either one of quaternary, i.e., four-value of {0, π/2, π, 3π/2}. Light signal E(t) 214 includes quaternary, i.e., 2 bits data every symbol. For this reason, in light signal E(t) 214, in the case where the transmission capacity is B [bits/s], symbol speed becomes equal to B/2 [Symbol/s], and the symbol interval becomes equal to τ=2/B sec.

The operation of light receiving apparatus 220 shown in FIG. 1 will now be described.

Received light signal E(t) 214 is branched into two light signals by beam splitter 228. One of the branched two light signals is inputted to delay interferometer 230, and the other light signal is inputted to delay interferometer 232.

Respective delay interferometers 230, 232 serve to further branch inputted light signals into two light signals. Furthermore, each of delay interferometers 230, 232 serves to delay the light signal of one side by τ thereafter to allow it to interfere with the light signal of the other side. Namely, each of delay interferometers 230, 232 allows light signals to interfere with a light signal preceding by one symbol to extract phase difference Δθ.

At this time, delay interferometer 230 allow a light signal of longer arm 230a to interfere with a light signal obtained by shifting the phase of a light signal of shorter arm 230b by π/4. For this reason, light intensities I1, I2 of two light output signals E1(t), E2(t) outputted from delay interferometer 230 are expressed as formula 1.

$$I1 = |E1(t)|^2 \propto 1 + \cos\left(\Delta\theta - \frac{\pi}{4}\right)$$ (Formula 1)

$$I2 = |E2(t)|^2 \propto 1 - \cos\left(\Delta\theta - \frac{\pi}{4}\right)$$

Balanced photoelectric converter 234 squares and detects two light output signals E1(t), E2(t) to convert the detected light output signals into electric signal x1(t) as shown in formula 2 in accordance with the difference between light intensities I1, I2 of light output signals E1(t), E2(t).

$$x1(t) \propto \cos\Delta\theta + \sin\Delta\theta = \begin{cases} 1 \text{ for } \Delta\theta = 0, \frac{\pi}{2} \\ -1 \text{ for } \Delta\theta = \frac{3\pi}{2}, \pi \end{cases}$$ (Formula 2)

Similarly, delay interferometer 232 allows a light signal of longer arm 232a to interfere with a light signal obtained by shifting the phase of a light signal of shorter arm 232b by −π/4. For this reason, light intensities I3, I4 of light output signals E3(t), E4(t) outputted from delay interferometer 232 are expressed as formula 3.

$$I3 = |E3(t)|^2 \propto 1 + \cos\left(\Delta\theta + \frac{\pi}{4}\right)$$ (Formula 3)

$$I4 = |E4(t)|^2 \propto 1 - \cos\left(\Delta\theta + \frac{\pi}{4}\right)$$

Balanced photoelectric converter 236 squares and detects two light output signals E3(*t*), E4(*t*) to convert detected light output signals into electric signal y2(*t*) as shown in formula 4 in accordance with the difference between light intensities I3, I4 of light output signal E3(*t*), E4(*t*). An output example of balanced photoelectric converters 234, 236 is shown in FIG. 4.

$$y2(t) \propto \cos\Delta\theta - \sin\Delta\theta = \begin{cases} 1 \text{ for } \Delta\theta = 0, \frac{3\pi}{2} \\ -1 \text{ for } \Delta\theta = \frac{\pi}{2}, \pi \end{cases} \quad \text{(Formula 4)}$$

It is to be noted that, on the light transmitting apparatus side, an original electric signal is encoded so that electric signals x1(*t*) and y2(*t*) obtained above at receiving apparatus result in original electric binary signals before encoding at transmitting apparatus, and is mapped to phase difference $\Delta\theta$ of transmitted optical signal E(t) 214.

However, in the light receiving apparatus using the DQPSK demodulation method shown in FIG. 1, there are problems as described below.

The first problem is that the apparatus configuration is not suitable for downsizing. The reason thereof is that two sets of optical modules (optical components) such as a delay interferometer and a balanced photoelectric converter are required for DQPSK demodulation.

The second problem is that the apparatus configuration is not suitable for realization of a low-cost apparatus. The reason thereof is that since two sets of optical modules are required as stated above and that since these optical modules are constructed so that optical components are assembled, the realization of low cost based on mass-production, as in semiconductor integrated circuit production, cannot be expected in the manufacturing process for the light receiving apparatus.

SUMMARY OF THE INVENTION

In view of the above, an object of the present invention is to provide a light receiving apparatus using a DQPSK demodulation method and a DQPSK demodulation method, which are adapted for realization of downsizing and low cost of the apparatus.

A first light receiving apparatus of the present invention using a DQPSK demodulation method, comprises:

one Mach-Zehnder interferometer for branching a received light signal into light signals at two arms to allow the branched two light signals to interfere with each other;

one balanced photoelectric converter for converting the two interfered light signals, by using the Mach-Zehnder interferometer, into an electric signal corresponding to the difference between light intensities of the two light signals; and a phase adjuster for dynamically shifting the phase of the light signal passed through one of the two arms at the Mach-Zehnder interferometer.

A second light receiving apparatus using a DQPSK demodulation method, comprises:

one Mach-Zehnder interferometer for branching a received light signal into light signals at two arms to allow the branched two light signals to interfere with each other;

one balanced photoelectric converter for converting the two interfered light signals, by using the Mach-Zehnder interferometer, into an electric signal corresponding to a difference between light intensities of the two light signals;

a clock extractor for extracting a clock signal of a symbol period from the electric signal outputted from the balanced photoelectric converter; and a wiring for delivering, to the Mach-Zehnder interferometer, an electric signal based on the clock signal which has been extracted by the clock extractor in order to shift the phase of a light signal passed through one of the two arms at the Mach-Zehnder interferometer.

A first DQPSK demodulation method of the present invention for demodulating a DQPSK-modulated light signal, comprises:

branching a received light signal into two light signals;

shifting the phase of one of the branched two light signals thereafter to allow the two light signals to interfere with each other; and converting the two interfered light signals into an electric signal corresponding to a difference between light intensities of the two light signals.

A second DQPSK demodulation method of the present invention for demodulating a DQPSK-modulated light signal, comprises:

branching a received light signal into two light signals by a delay interferometer;

allowing the branched two light signals to interfere with each other;

converting the two interfered light signals into an electric signal corresponding to a difference between light intensities of the two light signals;

extracting a clock signal of a symbol period of a light signal from the converted electric signal;

delivering the extracted clock signal to the delay interferometer; and allowing phase-shifts of $\pi/4$ and $-\pi/4$ to periodically take place at one of the two light signals by the delay interferometer in accordance with the clock signal.

The above and other objects, features, and advantages of the present invention will become apparent from the following description with reference to the accompanying drawings which illustrate examples of the present invention.

DESCRIPTION OF THE PREFERRED EMBODIMENTS

An Exemplary embodiment of the present invention will now be described in detail with reference to the attached drawings.

Figure 5:
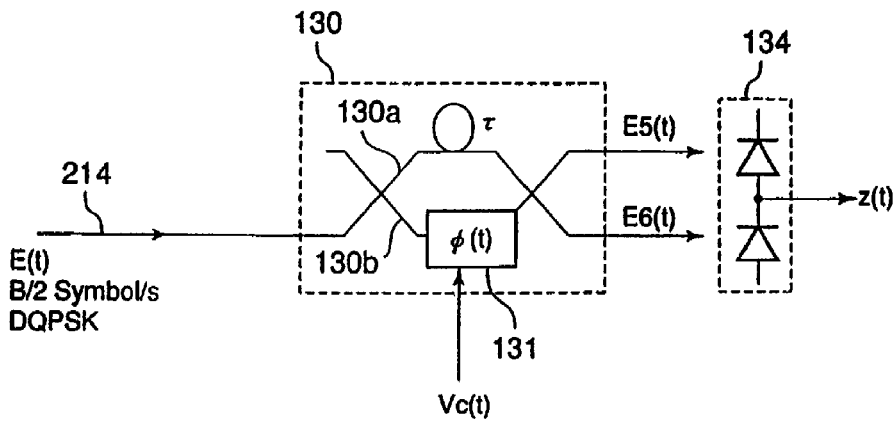
FIG. 5 is a block diagram showing the configuration of a light receiving apparatus using the DQPSK demodulation method of an exemplary embodiment of the present invention.

FIG. 5 is a block diagram showing the configuration of a light receiving apparatus using a DQPSK demodulation method (hereinafter referred to as DQPSK receiving apparatus) of the exemplary embodiment of the present invention.

The DQPSK receiving apparatus shown in FIG. 5 comprises one delay interferometer 130, and one balanced photoelectric converter 134.

At shorter arm 130b in delay interferometer 130, phase modulation of light signal E(t) 214 is performed on the basis of inputted electric signal Vc(t). Description will be made on the assumption that phase adjuster 131 is provided at shorter arm 130b.

Moreover, in delay interferometer 130, a light transmission path is formed within one arm 130a in order to create delay time τ with respect to the other arm 130b. Delay time τ is equal to a symbol interval of light signal E(t) 214.

The operation of the DQPSK receiving apparatus shown in FIG. 5 will now be described with reference to FIG. 6.

Received light signal E(t) 214 is inputted to delay interferometer 130.

Delay interferometer 130 serves to branch inputted light signal E(t) 214 into two light signals at arms 130a, 130b. The light signal of longer arm 130a is delayed by τ, and then interferes with the light signal of shorter arm 130b.

Moreover, suitable voltage Vc(t) (a voltage with an amplitude to permit the shift of phase of light signal E(t) 214) is applied to an electrode provided at phase adjuster 131 of shorter arm 130b. Voltage Vc(t) is applied to the electrode in synchronism at the time when the symbol at light signal E(t) 214 is switched. Here, Vc(t) is assumed to be V1 or V2. As stated above, at phase adjuster 131, since voltage Vc(t) of V1 or V2 is periodically applied to the electrode, the phase of light signal E(t) 214 is shifted by −π/4 or π/4.

Figure 6:
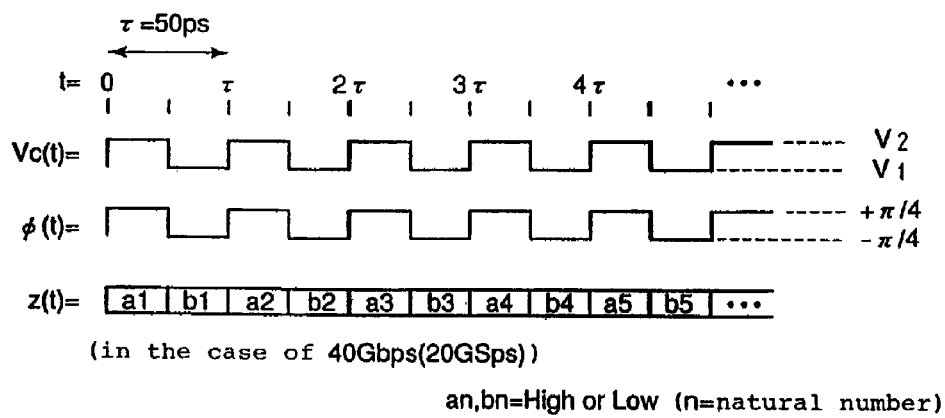
FIG. 6 is a diagram for explaining the operation of the light receiving apparatus shown in FIG. 5.

As shown in FIG. 6, voltage Vc(t) is switched from V1 to V2, or from V2 to V1 at period τ/2 which is one half of symbol interval τ of light signal E(t) 214. As a result of the fact that voltage Vc(t) is switched, shift quantity φ(t) of the phase at phase adjuster 131 is also alternately switched to values of π/4 and −π/4 at a period of τ/2.

Figure 1:
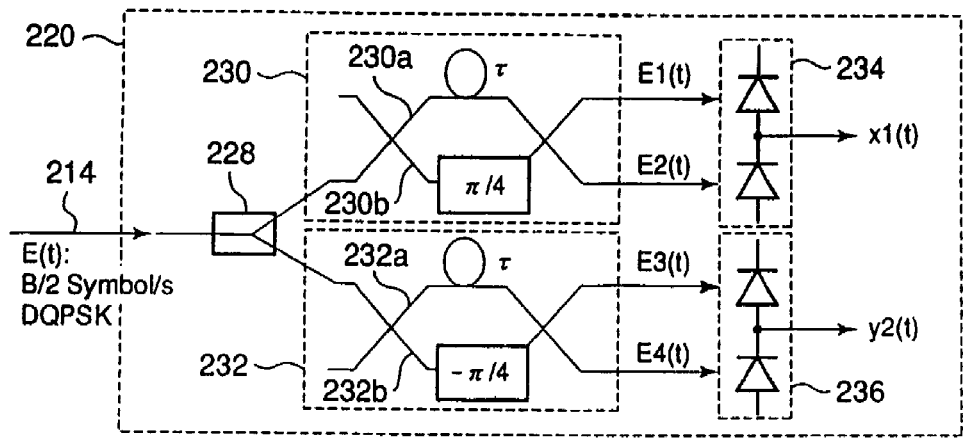
FIG. 1 is a block diagram showing a configuration example of a typical light receiving apparatus using a DQPSK demodulation method.
Figure 2:
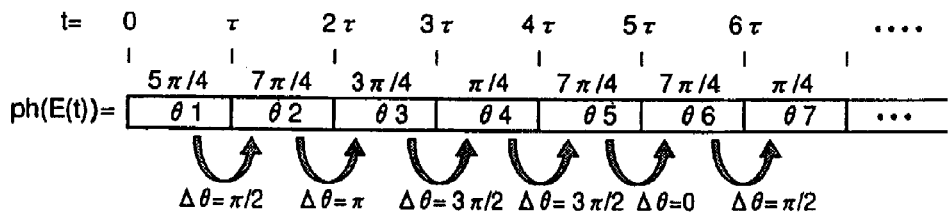
FIG. 2 is a diagram for explaining an example of a light signal of a typical DQPSK shown in FIG. 1.
Figure 3:
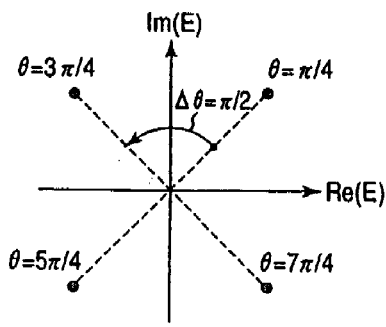
FIG. 3 is a diagram for explaining a phase state of a light signal of a typical DQPSK shown in FIG. 2.

In the state where shift quantity φ(t) of the phase at phase adjuster 131 is π/4, signal components of light output signals E1(t), E2(t) of delay interferometer 230 shown in FIG. 1 are obtained as interferometer output signals (light output signals) E5(t), E6(t). On the other hand, in the state where shift quantity φ(t) of the phase at phase adjuster 131 is −π/4, signal components of light output signals E3(t), E4(t) of delay interferometer 232 shown in FIG. 1 are obtained as interferometer output signals (light output signals) E5(t), E6(t).

Figure 4:
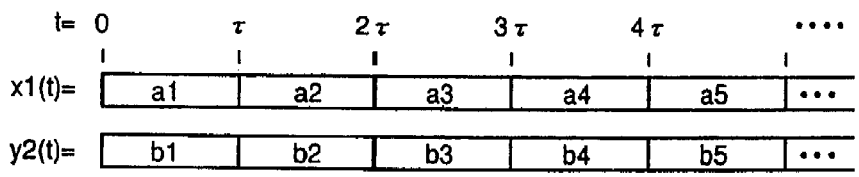
FIG. 4 is a diagram for explaining an output example of the balanced photoelectric converter shown in FIG. 1.

Accordingly, as shown in FIG. 6, electric signal x1(t) and electric signal y2(t) which are shown in FIG. 4 are alternately obtained as electric signal z(t) which is an output of balanced photoelectric converter 134.

In the present embodiment, in DQPSK demodulation, only one delay interferometer 130 and only one balanced photoelectric converter 134 are used. Accordingly, the number of optical components can be reduced to one-half as compared to the apparatus shown in FIG. 1. Thus, the apparatus can be downsized as compared to the apparatus shown in FIG. 1. In addition, since the number of optical components, whose costs are difficult to reduce, are decreased, the cost can be suppressed as compared to the apparatus shown in FIG. 1.

PRACTICAL EXAMPLE

A practical example of the present invention will now be described with reference to the attached drawing.

Figure 7:
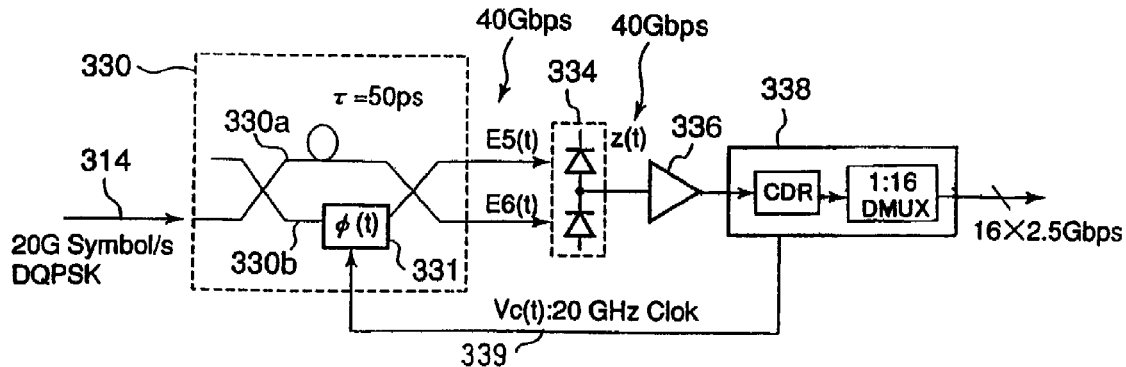
FIG. 7 is a block diagram showing the configuration of a practical example of the light receiving apparatus shown in FIG. 5.

FIG. 7 is a block diagram showing the configuration of a practical example of the DQPSK receiving apparatus of the present invention shown in FIG. 5. FIG. 7 shows, in a practical manner, the configuration of the DQPSK receiving apparatus shown in FIG. 5 in connection with the case where the transmission capacity of light signal E(t) is expressed as B=40 G bps.

The DQPSK receiving apparatus shown in FIG. 7 comprises delay interferometer 330 supplied with received light signal E(t) 314 and functions as a demodulator, a balanced PD (Photo Detector) 334, TIA (Transimpedance Amplifier) 336, and 1:16 DMUX (Demultiplexer) with CDR (Clock and Data Recovery) 338 function to divide an electric signal of 40 G bps that TIA 336 outputs into 16 signals.

Delay interferometer 330 is a Mach-Zehnder interferometer (MZI). The MZI is ordinarily formed of gallium arsenic or lithium niobate.

In delay interferometer 330, the length of arm 330a is longer than that of arm 330b. Thus, a light signal which has been passed through arm 330a is delayed by 50 ps as compared to a light signal which has been passed through arm 330b. This is because in the case where the transmission capacity of light signal E(t) 314 is 40 G bps, the symbol speed is 20 G Symbol/s and the symbol interval is 50 ps as shown in FIG. 6.

Phase adjuster 331 at delay interferometer 330 is provided at one arm 330b of delay interferometer 330. Moreover, phase adjuster 331 is of the structure in which an electrode is provided. When voltage Vc(t) is applied to this electrode, the refractive index of the light transmission path is changed. As a result, the phase of light signal E(t) 314 is changed. The amplitude value of voltage Vc(t) is a value to change the refractive index of the light transmission path so that the shift quantity of the phase of light signal E(t) 314 becomes equal to π/4 or −π/4.

Balanced PD 334 converts two light output signals E5(t), E6(t) outputted from delay interferometer 330 into a current signal with a level proportional to a difference between the light intensities of the two light output signals E5(t), E6(t).

TIA 336 converts a current signal converted at balanced PD 334 into a voltage signal to amplify the voltage signal. The signal thus amplified is inputted to 1:16 DMUX with CDR 338 function.

1:16 DMUX with CDR 338 function is a clock extractor for extracting a clock signal with 20 GHz of symbol rate from the signal amplified at TIA 336.

A clock signal with 20 GHz extracted by 1:16 DMUX with CDR 338 function is applied, as voltage Vc(t), to phase adjuster 331 at delay interferometer 330 through wiring 339. At this time, the timing at which the voltage value of a clock signal is switched from the minimum value to the maximum value and the timing at which the voltage value of the clock signal is switched from the maximum value to the minimum value, are caused to be in correspondence with the timing at which a symbol of light signal E(t) 314 inputted to delay interferometer 330 is switched.

Accordingly, a binary signal appears every 25 ps at light output signal E5(t) and light output signal E6(t). Further, electric signal z(t) proportional to a difference between the light intensities of light output signals E5(t) and E6(t) is obtained as an output of balanced PD 334. Electric signal z(t) is a binary signal every 25 ps, i.e., one 40 Gbps binary signal.

In this case, voltage Vc(t) of a clock signal delivered to phase adjuster 331 is adjusted in advance within 1:16 DMUX with CDR 338 function, or by external voltage regulating means (not shown).

As described above, in accordance with the exemplary embodiment, advantages as described below can be obtained.

The first advantage is to have the ability to downsize the light receiving apparatus using the DQPSK modulation method. The reason thereof is that two delay interferometers for DQPSK demodulation and two balanced photoelectric converters are required in the apparatus shown in FIG. 1, whereas a DQPSK-modulated light signal can be demodulated by one delay interferometer and one balanced photoelectric converter.

The second advantage is to have the ability to reduce the cost of the light receiving apparatus using a DQPSK demodulation method. The reason thereof is that because two sets of optical components are required in the apparatus shown in FIG. 1, whereas since it is sufficient to only use one set of optical components, the number of optical components, whose costs are difficult to decrease, can be reduced to one-half.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A light receiving apparatus using a DQPSK demodulation method, comprising:
   one Mach-Zehnder interferometer configured to branch a received DQPSK light signal into light signals at two arms to allow the branched two light signals to interfere with each other;
   one balanced photoelectric converter for converting the two interfered light signals, by using the Mach-Zehnder interferometer, into an electric signal corresponding to a difference between the light intensities of the two light signals; and
   a phase adjuster for dynamically shifting the phase of the light signal passed through one of the two arms at the Mach-Zehnder interferometer so that the phase difference between the two arms is shifted between $\pi/4$ and $-\pi/4$ at a period which is half of a symbol period of the DQPSK light signal.

2. The light receiving apparatus according to claim 1, wherein optical path lengths of the two arms at the Mach-Zehnder interferometer are different from each other, and the optical path difference corresponds to a symbol period of a light signal, and
   the phase adjuster serves to shift, in accordance with an electric signal from the out side of the Mach-Zehnder interfermoter, the phase of a light signal passed through one arm at the Mach-Zehnder interferometer.

3. The light receiving apparatus according to claim 2, wherein the phase adjuster serves to periodically produce, in accordance with an electric signal from the out side of the Mach-Zehnder interfermoter, phase-shifts of $\pi/4$ and $-\pi/4$ in a light signal passed through one arm at the Mach-Zehnder interferometer.

4. A light receiving apparatus using a DQPSK demodulation method, comprising:
   one Mach-Zehnder interferometer configured to branch a received DQPSK light signal into light signals at two arms to allow the branched two light signals to interfere with each other;
   one balanced photoelectric converter for converting the two interfered light signals, by using the Mach-Zehnder interferometer, into an electric signal corresponding to a difference between the light intensities of the two light signals;
   a clock extractor for extracting a clock signal of a symbol period from the electric signal outputted from the balanced photoelectric converter; and
   a wiring for delivering, to the Mach-Zehnder interferometer, an electric signal based on the clock signal which has been extracted by the clock extractor in order to shift the phase of a light signal passed through one of the two arms at the Mach-Zehnder interferometer so that the phase difference between the two arms is shifted between $\pi/4$ and $-\pi/4$ at a period which is half of a symbol period of the DQPSK light signal.

5. A light receiving apparatus using a DQPSK demodulation method, comprising:
   one Mach-Zehnder interfering means for branching a received DQPSK light signal into light signals at two arms to allow the branched two light signals to interfere with each other;
   one balanced photoelectric converting means for converting the two interfered light signals, by using the Mach-Zehnder interfering means, into an electric signal corresponding to a difference between the light intensities of the two light signals; and
   phase adjusting means for dynamically shifting the phase of a light signal passed through one of the two arms at the Mach-Zehnder interfering means so that the phase difference between the two arms is shifted between $\pi/4$ and $-\pi/4$ at a period which is half of a symbol period of the DQPSK light signal.

6. A DQPSK demodulation method for demodulating a DQPSK-modulated light signal, comprising:
   receiving a DQPSK modulated light signal;
   branching the received light signal into two light signals;
   shifting the phase of one of the branched two light signals thereafter so that the phase difference between the two arms is shifted between $\pi/4$ and $-\pi/4$ at a period which is half of a symbol period of the DQPSK light signal to allow the two light signals to interfere with each other; and
   converting the two interfered light signals into an electric signal corresponding to a difference between the light intensities of the two light signals.

7. The DQPSK demodulation method according to claim 6, comprising:
   giving a delay corresponding to symbol period with respect to one light signal to the other light signal of the two light signals until the two light signals are caused to interfere with each other; and
   shifting the phase of one of the two light signals in accordance with an externally received electric signal.

8. The DQPSK demodulation method according to claim 7, wherein phase-shifts are caused to periodically take place at one of two light signals in accordance with an externally received electric signal.

9. A DQPSK demodulation method for demodulating a DQPSK-modulated light signal, comprising:
   receiving a DQPSK modulated light signal;
   branching a received light signal into two light signals by a delay interferometer;
   allowing the branched two light signals to interfere with each other;
   converting the two interfered light signals into an electric signal corresponding to a difference between the light intensities of the two light signals;
   extracting a clock signal of a symbol period of a light signal from the converted electric signal;
   delivering the extracted clock signal to the delay interferometer; and
   allowing phase-shifts of $\pi/4$ and $-\pi/4$ to periodically take place at one of the two light signals by the delay interferometer at a period which is half of the symbol period extracted from the clock signal and in accordance with the clock signal.

* * * * *